(12) United States Patent
Belinkiy et al.

(10) Patent No.: US 8,955,035 B2
(45) Date of Patent: Feb. 10, 2015

(54) ANONYMOUS PRINCIPALS FOR POLICY LANGUAGES

(75) Inventors: Mira Belinkiy, Redmond, WA (US);
Tolga Acar, Sammamish, WA (US);
Thomas Roeder, Redmond, WA (US);
Jason Mackay, Sammamish, WA (US);
Brian LaMachia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 12/970,867

(22) Filed: Dec. 16, 2010

(65) Prior Publication Data

US 2012/0159577 A1 Jun. 21, 2012

(51) Int. Cl.
*H04L 29/00* (2006.01)
*H04L 9/32* (2006.01)
*G06F 21/62* (2013.01)

(52) U.S. Cl.
CPC .......... *H04L 9/3265* (2013.01); *G06F 21/6218* (2013.01); *H04L 2209/42* (2013.01)
USPC ................. 726/1; 726/5; 726/6; 726/7; 726/9

(58) Field of Classification Search
USPC ................................................ 726/5, 6, 7, 9
See application file for complete search history.

(56) References Cited

U.S. PATENT DOCUMENTS

| | | |
|---|---|---|
| 7,222,187 B2 | 5/2007 | Yeager |
| 7,594,224 B2 | 9/2009 | Patrick |
| 7,661,128 B2 | 2/2010 | Chen |
| 2006/0225130 A1 | 10/2006 | Chen |
| 2007/0169168 A1 | 7/2007 | Lim |
| 2007/0180490 A1 | 8/2007 | Renzi |
| 2009/0037990 A1 | 2/2009 | Zeng |
| 2009/0300045 A1 | 12/2009 | Chaudhry |
| 2009/0320118 A1 * | 12/2009 | Muller et al. ............. 726/9 |

FOREIGN PATENT DOCUMENTS

WO     WO2007095691     8/2007

* cited by examiner

*Primary Examiner* — Brandon Hoffman
*Assistant Examiner* — Michael D Anderson
(74) *Attorney, Agent, or Firm* — Steve Wight; Judy Yee; Micky Minhas

(57) ABSTRACT

Techniques to allow a security policy language to accommodate anonymous credentials are described. A policy statement in a security policy language can reference an anonymous credential. When the policy statement is evaluated to decide whether to grant access to a resource mediated by the policy statement, the anonymous credential is used. The policy language can be implemented to allow one anonymous credential to delegate access-granting rights to another anonymous credential. Furthermore, an anonymous credential can be re-randomized to avoid linkage between uses of the anonymous credential, which can compromise anonymity.

20 Claims, 6 Drawing Sheets

<A> says K-User can read digitalContent:"file:///GridFTPRoot/data1.txt"  120

<B> says Joe can act as <B>  122

<1> says Alice can act as <1> if Alice posesses attribute "GroupName:*@microsoft.com"  124 rule #1

Allow access  126
    to resource with attribute WebService
    if <Anonymous> is Subscriber and action is read or write.

Allow delegation of access control rule #1  128
    to subjects with Anonymous attribute.
  Conditions:
    delegation must expire within 1 month.

IsAnonymous()  130

FIG. 2

ANONYMOUS PRINCIPALS FOR POLICY LANGUAGES

BACKGROUND

Networked systems such as computing grids, clouds, etc., provide resources to principals. A principal is any entity or actor in a security scenario, such as a user, a portion of code, a running service, an authority, a server, an organization, etc. Principals may possess attributes that are important to a networked system. For example, if the networked system is a simple web server, to gain access to resources on the web server, the principal may need to prove that it possesses a required attribute, e.g., "is an employee". Access to such a system and its resources is often controlled according to a security policy expressed in a high level policy language, which may be implemented by a separate security system.

Distributed or network security systems may use a decentralized policy language such as the extensible Access Control Markup Language (XACML) or the Security Policy Assertion Language (SecPAL) to express identity, delegate authority, and implement access control requirements. These languages represent principals and resources as elements in the language, and allow policy statements to be written that express authorization requirements.

Such languages currently rely on authentication methods that reveal the identity of principals or subjects. For example, in SecPAL, RSA public keys are commonly used as principal identifiers. By design, an RSA key serves as a unique identifier for an individual, so an RSA key reveals extra information that is not always necessary for the execution of a security policy; releasing such information prevents anonymity. However, under some circumstances an operator of a networked system or service may need to verify only that a principal has a certain attribute (e.g., has paid a fee), without regard for the identity of the principal. In other words, the service operator may wish to allow anonymous access.

Recent advances in cryptography include designs for anonymous credential systems. Using these anonymous credential systems, services can verify useful attributes of a principal without revealing the principal's identity. However, it has not previously been possible to use anonymous credential technology with a policy language. Techniques related to using anonymous credentials in a security policy language are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques to allow a security policy language to accommodate anonymous credentials are described herein. Using these techniques, a policy statement in a security policy language can reference an anonymous credential. When the policy statement is evaluated to decide whether to grant access to a resource mediated by the policy statement, the anonymous credential is used. An implementation of the policy language can allow one anonymous principal to delegate access-granting rights to another anonymous principal.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 2 shows example policy statements and functions using this approach.

DETAILED DESCRIPTION

Overview

Figure 1:
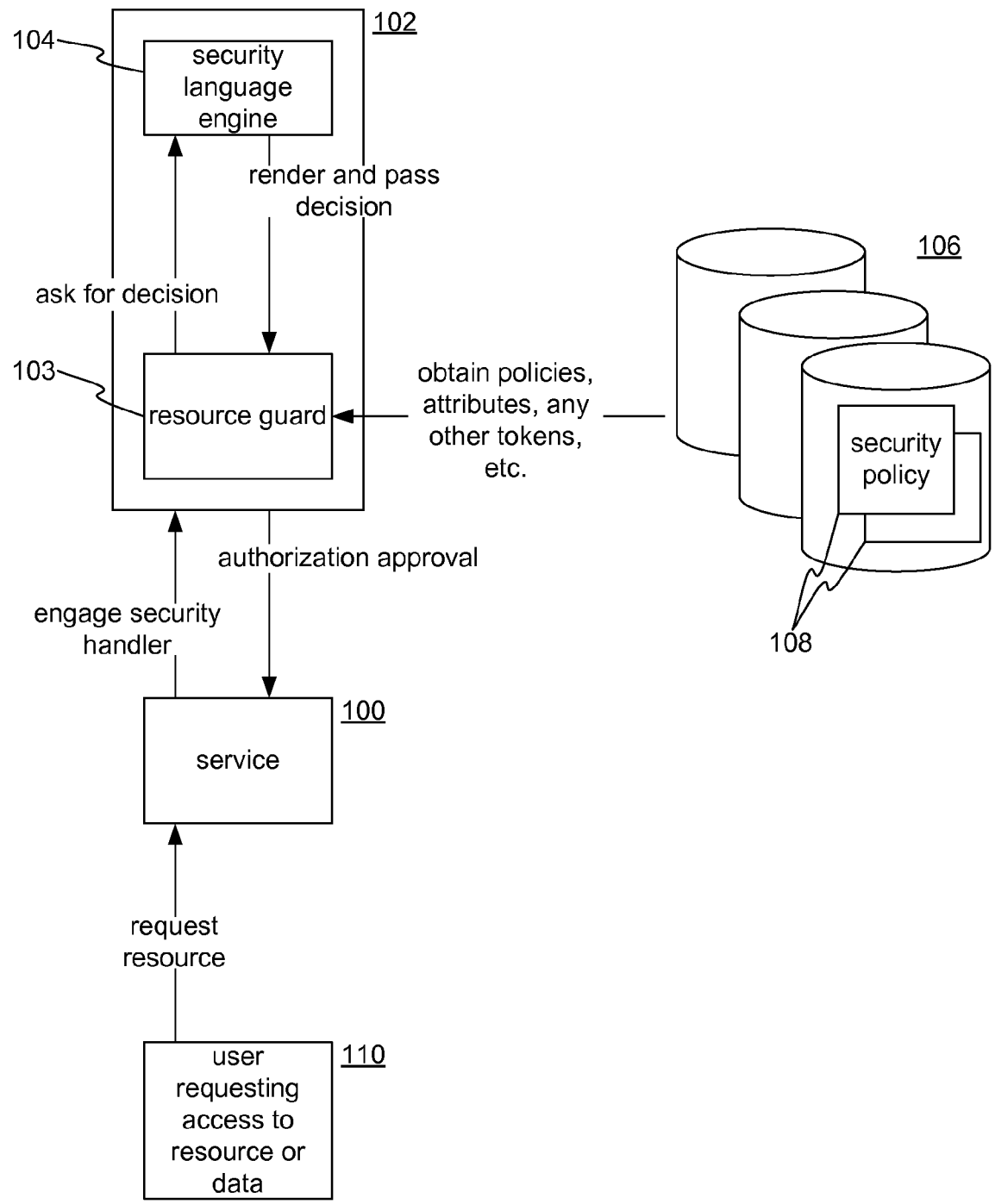
FIG. 1 shows an example of a service using a security system to control access to resources provided by the service.

Embodiments discussed below relate to the use of anonymous credentials in security policy languages. Discussion will begin with an overview of security policy languages ("security language" for short), followed by discussion of an example system in which a network service uses a security system that implements a security language to control access to resources provided by the service. Details of how a security language can be implemented to facilitate anonymous credentials will then be described. This will be followed by discussion of how anonymous credentials may be used in practice, including an example system and an example anonymous credential. Discussion will conclude with explanation of a mathematical foundation for anonymous credentials that is adapted for use with a policy language.

Security Policy Languages

Embodiments described herein involve security languages that can accommodate anonymous credentials. A security language is a formal computer language with a well-defined syntax and a grammar of statements for expressing security policy. Examples, which have not previously included anonymous credential features, include SecPAL, XACML, the Security Assertion Markup Language (SAML), and the Web Services Security Policy Language (WS-SecurityPolicy).

With some security languages, it may be possible to express both fine-grained access control policy (e.g., method-level access, file-level access, data-record-level access) as well as coarse-grained access control policy (e.g., service-level access, host-level access, etc.). Some security languages may also allow a principal to delegate rights to another principal. In the case of SecPAL, a statement made by a principal may, for example: define a binding between a principal and an attribute; specify a principal's permissions to operate on a resource; express a trust or delegation policy; express an authorization policy; revoke a prior assertion; or declare a principal identifier alias. Such statements or assertions are expressed using a uniform grammar which maps to English sentences as well as an XML schema. Examples and a complete formal definition of SecPAL, as well as other security languages, are readily available elsewhere.

For discussion herein, it is sufficient that a policy language be considered to be a formal language with syntax and having semantics for expressing security policies that control access to resources by principals. In some cases, statements or policies may be composable or may reference other statements or policies. Additionally "fine-grained" may refer to the intersection of a set of constraints on an access right, for example "Joe" may be allowed to say who can read "file:///foo", but only if the user being granted access is a member of groups A and B, and the access being granted is time-limited to expire after 1 week, and only if this user is NOT an anonymous principal. This stacking of constraints can allow a level of control not possible with traditional ACL (access control list) based systems.

Example System Using Security Language

FIG. 1 shows an example of a service 100 using a security system 102 to control access to resources provided by the service 100. The service 100 may be an individual server, a service running on a cloud, a grid computing service, a custodian of access to resources, a data storage service, etc. The security system 102 may be a dedicated server, a distributed application, a service running in a computing grid, etc., that executes modules that implement some arbitrary policy language. By way of example only, such modules may include a resource guard 103 and a security language engine 104. The security language handler may perform functions such as receiving the identity of a principal requesting access to a resource (which may be authenticated via a secure handshake), acquiring attributes of principals from an attribute authority (e.g., an LDAP (lightweight directory access protocol) server, X.509 server, etc.), retrieving any relevant or necessary tokens representing principals, or retrieving any policies 108 needed to evaluate an access request. The information obtained by the resource guard 103 is passed to the security language engine, which evaluates a policy and returns an access decision to the resource guard 103. If granted, authorization approval is then passed to the service 100, which in turn grants access to the requested resource to the principal that requested access.

One or more services or data stores 106 may provide security policies 108, and possibly attributes of principals, tokens, etc. The security policies 108 may be in the form of text files containing statements of the security language or statements conforming to the grammar and syntax of the security language. The security policies 108 may express, for example, which principals may access which resources. Access may be conditional; a principal might be granted access only when some specified condition is met. Such a condition may be a simple fact, e.g., "joe [a principal] is an employee". A condition may also be a complex Boolean expression, e.g., "Joe is an employee AND (the current date is before 2012 OR joe belongs to somedomain.org)".

For illustration, FIG. 1 shows an example of a context in which a security language may be used. Embodiments described herein may be used in nearly any context in which a security language is employed.

Security Language with Features for Anonymous Credentials

Techniques to add anonymous principals to policy languages are discussed next. In one embodiment, anonymous principals can authorize other (potentially anonymous) principals to access resources and services by providing tokens signed with anonymous signatures (note that technology for anonymous signatures is available and described elsewhere). Regarding the addition of anonymous principals to policy languages, as will be explained later, there may be principals that use anonymous credentials but publish a fixed public key, and there may be anonymous principals that use credentials that can be re-randomized over time to enhance long-term anonymity and to disconnect distinct actions by a same anonymous user.

As will be shown, any previously existing policy language can be modified to accommodate anonymous credentials. Most policy languages have a concept of a principal or its equivalent (e.g., "subject" in XACML), which is an entity that may grant or acquire access rights to a resource. By allowing a policy language to reference anonymous principals, a principal represented by an anonymous credential can be treated just like an ordinary principal in the policy language. That is, depending on the particular policy language, an anonymous principal may be referenced in policy statements, granted access or delegation rights in a policy statement, may be asserted as having particular attributes, may be tested to determine if it has some given attribute, may delegate rights to other principals, etc.

In one embodiment, the policy language is provided with a special type of principal, to be referred to as an "anonymous principal". Implementing a new principal type is straightforward; some policy languages already support adding new principal types. In a policy language statement, an instance of an anonymous principal type is represented by a predefined placeholder symbol, much like a variable or parameter, according to the language. FIG. 2 shows example policy statements and functions using this approach. Example statement 120 in effect states that some anonymous principal, represented by "<A>" asserts that another principal, "K-User", can read a file. In example statement 122, an anonymous principal "<B>" grants or delegates to principal "joe" the right to act as "<B>". In example statement 124, anonymous principal "<1>" states that principal "Alice" can act with the authority of anonymous principal "<1>" if "Alice" has a particular group name as an attribute. Example statement or rule 126, in XACML, allows read or write access to a resource if an anonymous principal is a subscriber. Moreover, as shown in example statement or rule 128, a rule can be delegated to an anonymous principal based on a condition of the delegation expiring after a fixed time period. In general, a policy language may be implemented such that anywhere a principal can appear in a statement, an anonymous principal may also be used. That is, while an anonymous principal is a special type of principal and may involve some special handling during execution or evaluation, the policy language generally allows an anonymous principal to function as a non-anonymous principal or to be used in the same ways that a non-anonymous principal can be used.

Note that some of the example statements include variables, some of which may represent principals. To appreciate the difference between an anonymous credential placeholder (discussed later) and an ordinary variable representing a principal, consider that the anonymous credential placeholder represents an anonymous principal in the context of an anonymous credential. The anonymous credential placeholder is not a variable (in the sense of a logic variable) but rather functions like an identifier in the language that is meant to refer to the same anonymous principal throughout the credential/token. In this way, it is possible to have a credential with multiple anonymous principals in it and give them each their own "name" or label. When multiple such credentials are used together these names must be disambiguated. For example the placeholder "<1>" may refer to an anonymous principal throughout a first token, but "<1>" appearing in a second token does not refer to the same principal from the first token.

In one embodiment, the policy language may include functions or other constructs specific to anonymous principals that may allow reasoning about anonymity. For example, a function 130 may be provided to test whether a principal is of the anonymous type or to constrain delegation from anonymous principals. In this way, the policy language can allow statements that restrict rights specifically of anonymous principals. For instance, certain services or resources might be made available only to non-anonymous principals. Thus programs guarding resources can mitigate the risk of allowing anonymous access for critical resources.

The policy language may be augmented with functions or constructs other than or in addition to the type-testing function mentioned above. A restriction construct might be used to restrict an anonymous principal based on the anonymous principal's level in a credential. Such a construct might be used, for example, to grant access to principals at level 1 (<1> in the token), because they have been validated directly by the trusted known public authority, or might be used to allow anonymous principals at levels less than or equal to 2. A function can be provided to label a bootstrapped RSA-based principal with an attribute that tells the resource guard that the corresponding credential was granted to an anonymous principal on an ephemeral key. This can take the form of an attribute embedded into the signed token returned by STS 194. Therefore, it could not be altered or removed. A policy could thereby make tests on standard RSA (non-anonymous) credentials to determine whether or not they were bootstrapped from an anonymous credential.

In example statement 124, the symbol used to represent an anonymous principal is a pair of angle brackets bracketing an integer. While any canonical form of symbol may be used, as will be discussed later, in one embodiment, an integer may be used to represent a delegation level of an anonymous credential. However, in a general embodiment an anonymous principal is represented by a predefined form of placeholder in a policy statement, and the placeholder, if anonymity is to be preserved, must not indicate any properties or features of the anonymous principal or the corresponding anonymous credential(s).

It should be noted that some existing anonymous signature systems allow delegation, where one anonymous user can delegate (via signatures) rights to other anonymous users. Such delegation can be integrated into a policy language with features for anonymity. Statements that anonymously delegate rights are expressed in the language as statements by anonymous principals and these statements are signed using anonymous signatures. Such delegation is useful but not required; some implementations may simply allow (anonymous) principals to be represented by anonymous credentials.

Example System Using Anonymous Credentials

Figure 3:
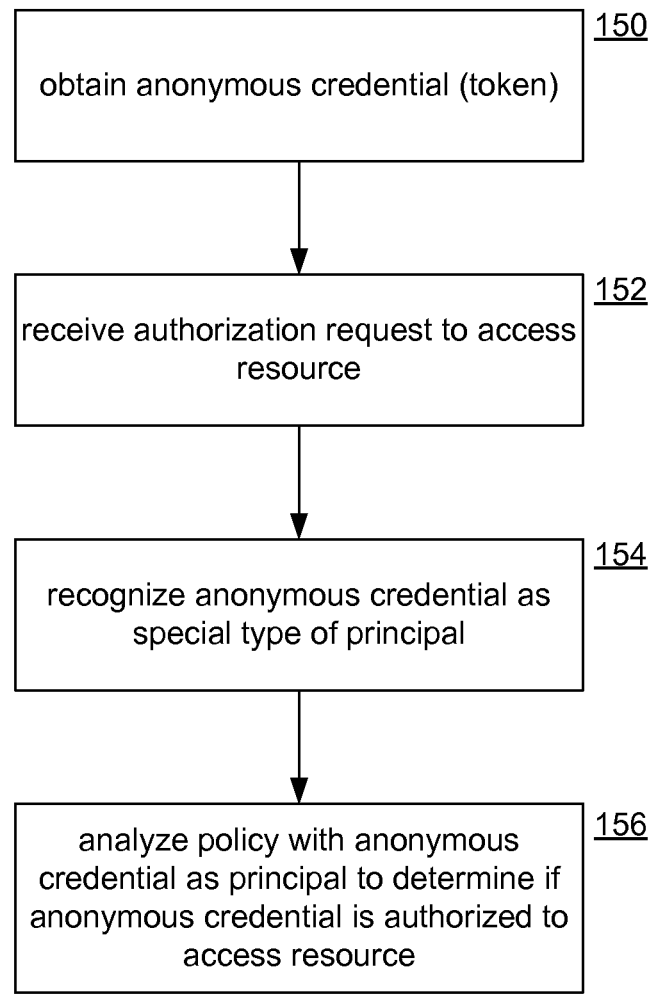
FIG. 3 shows a process of using anonymous credentials when processing a security policy.

FIG. 3 shows a process of using anonymous credentials when processing a security policy. An anonymous credential, in the form of a security token, is obtained by an anonymous principal at step 150. The anonymous credential may prove an attribute of the holder without revealing the identity of the principal (e.g., the credential was granted by a particular authority). An authorization request sent by the anonymous principal is received at step 152. For example, a security server or a module that implements a policy language receives the request. The anonymous credential is treated as a special type of principal at step 154. More specifically, the server or module, when deserializing or parsing the request, recognizes the presence of a symbol for an anonymous credential and uses in its place the anonymous credential of the anonymous principal. At step 156 the anonymous credential is used to determine whether the credential holder is authorized to access the resource. For example, an attribute of the anonymous credential is verified and based thereon access granted or denied.

Regarding processing of the credential, in one embodiment the server creates a new unique identifier for each principal at each level and then uses those identifiers as the names of the principals when processing the claims attested to in the credential. Multiple credentials with the same anonymous principal (e.g., <1>) are mapped to different identifiers. However, it is also possible for the user to provide an extra proof that two anonymous principals in two separate credentials refer to the same principal (without revealing the identity of that principal). The user can only perform this action if the user knows the secret key of the principal in question. In this case, the server would process the first credential, creating a new unique identifier for <1> in that credential, then, upon processing the proof and the second credential, would assign the same identifier for <1> in the second credential.

Figure 4:
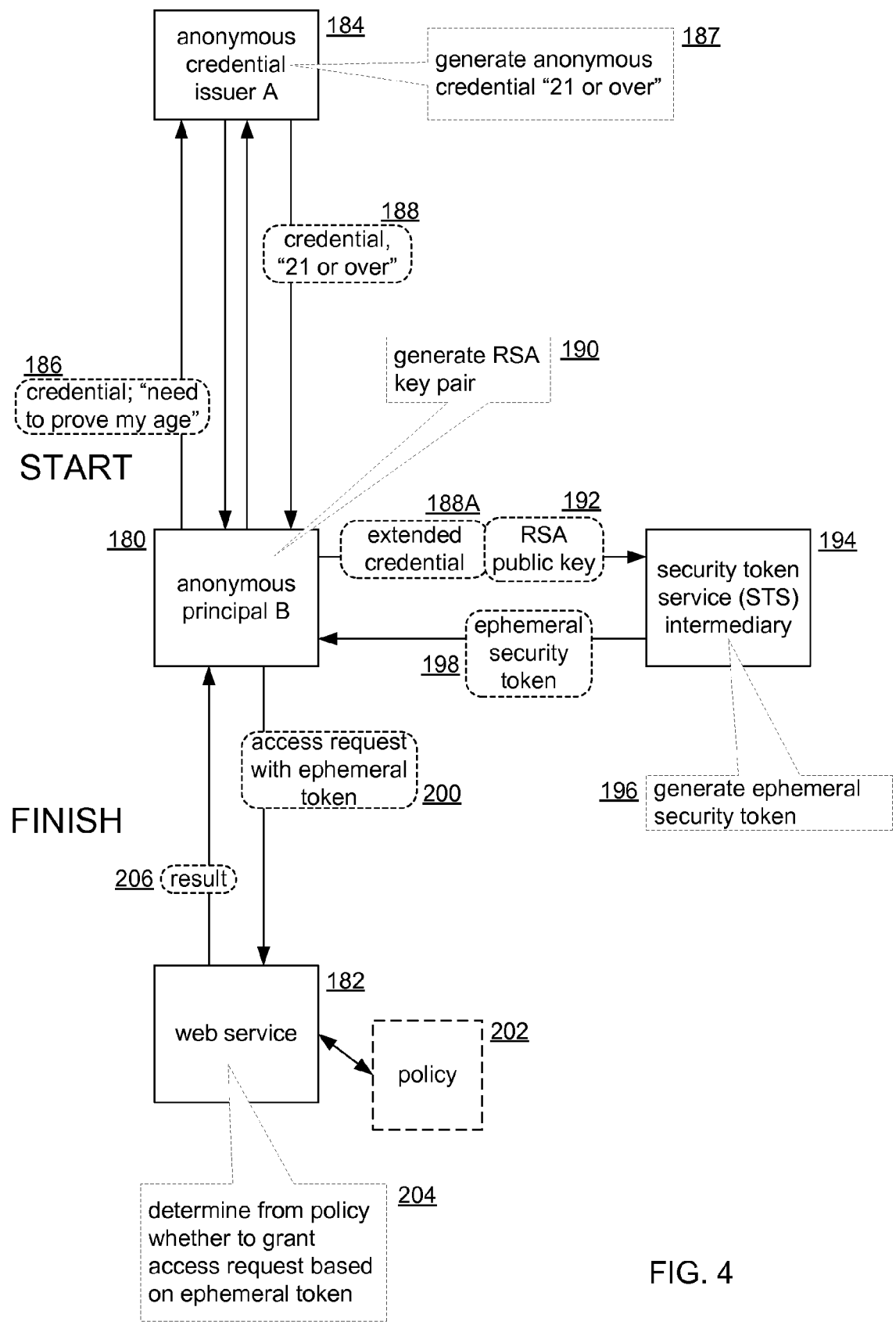
FIG. 4 shows a system that can be used to bootstrap anonymous credentials into an infrastructure that already supports a policy language.

FIG. 4 shows a system that can be used to bootstrap anonymous credentials into an infrastructure that already supports a policy language. The progression of a principal 180 ("B") anonymously accessing a web service 182 will be explained in chronological order. A general purpose data network to handle communications is assumed present but is not shown.

Initially, principal 180 establishes a credential by sending to an anonymous credential issuer 184 (i.e., an anonymous credential authority) a request 186 for a token or credential attesting to an attribute, for example, that the principal 180 has a certain age, that the credential was issued by a particular entity, etc. The anonymous credential issuer 184 (e.g., a governmental motor vehicle administration) confirms the age of principal 180 and uses a private key to sign, at step 187, an initial anonymous credential 188. Initial anonymous credential 188 proves that the anonymous credential issuer 184 confirmed an age over 21. FIG. 4 shows a simplified view of this exchange. In practice, the exchange may be more complex than shown; an issuance protocol is used involving multiple rounds of communication between the issuer 184 and the principal 180.

The principal 180, now in possession of the initial anonymous credential 188, uses a security token service (STS) 194 to acquire an anonymous token. The STS 194, i.e., a certificate authority, may be a special server that converts anonymous tokens into legacy tokens over ephemeral RSA keys. The principal 180 first performs a step 190 of generating an ephemeral public-private key pair (e.g., using RSA). The ephemeral public key 192 is sent as a request to the STS 194, and may be supplemented with or accompanied by a modified version 188A of the anonymous credential 188 established during issuance. This modified version 188A of the anonymous credential 188 is extended to attest to the RSA public key 192. The request may also specify a particular type of security token or security protocol that is desired by the principal 180 for compatibility with the web service 182. In response, the STS 194 performs a step 196 of generating an anonymous token in the form of an ephemeral security token 198, which is returned to the anonymous principal 180. The ephemeral security token 198 has an attribute that attests to "age over 21", but has no information about the identity of the principal 180. The anonymous principal 180 now sends the ephemeral security token 198 with a request 200 to access the web service 182.

The web service 182 may use security infrastructure (similar to security system 102 in FIG. 1) when it receives the request 200. The security infrastructure obtains any necessary security policy 202. The policy 202 may describe which principals can access the web service 182 under which conditions (e.g., age over twenty one). The security infrastructure determines at step 204 that the ephemeral security token 198 is properly signed and attests to the necessary conditions that policy 202 specifies as a prerequisite for access to the web service 182. The web service 182 returns a result 206 such as providing access to a requested resource, a copy of a document, access to a database, a web session, etc. Note that the policy 202 might specify other tests for access. For example, access may be granted based on the condition that the credential is an anonymous type of credential, for example "IsAnonymous( )". A reverse of this constraint can be used, for example "IsNotAnonymous( )". For example, a policy may aim to grant access to anyone with the "Accounting" credential as long as they are NOT anonymous.

In one embodiment, the principal 180 may use re-randomization to avoid the possibility that different accesses to the web service 182 can be linked to same person or principal (even if the identity of the principal 180 may not be known or knowable). Consider that there are two ways that a principal can use a signed token.

First, the principal can directly prove to the program guarding a resource that it knows the anonymous key that was signed and authorized by the token. This method is anonymous, because the principal can re-randomize its token for each access. This re-randomization of the token (and signatures) makes the accesses un-linkable, even by the principals that generated the token. However, this use of an anonymous signature, though practical, is compute-intensive.

Second, to reduce the computation time, a principal can extend an anonymous token (adding a new level of delegation) to authorize an ephemeral RSA key of its own creation. This new token can either be used directly or can be converted (by a secondary Security Token Service) to a legacy (non-anonymous) token involving only the ephemeral RSA key. Accesses using the new ephemeral key are linkable, but the principal can create a new ephemeral key at any time, and accesses cannot be linked between two different ephemeral RSA keys.

It should be noted that when policy language implementations perform serialization or otherwise parse a policy statement, they should not add any unique identification in the serialization, such as a timestamp, which may act as a pseudonym that can compromise anonymity. Additionally, fine-grained expiration dates on the credentials should be avoided, as they also can be used to identity a user. For example, a twenty four hour expiration time can possibly identify a user, and a millisecond timestamp would lead to easy identification. If a standard serialization is to be modified for anonymous credentials, these kinds of potential unique pseudo-identifiers should be avoided or removed.

Multi-Level Anonymous Credentials

Figure 5:
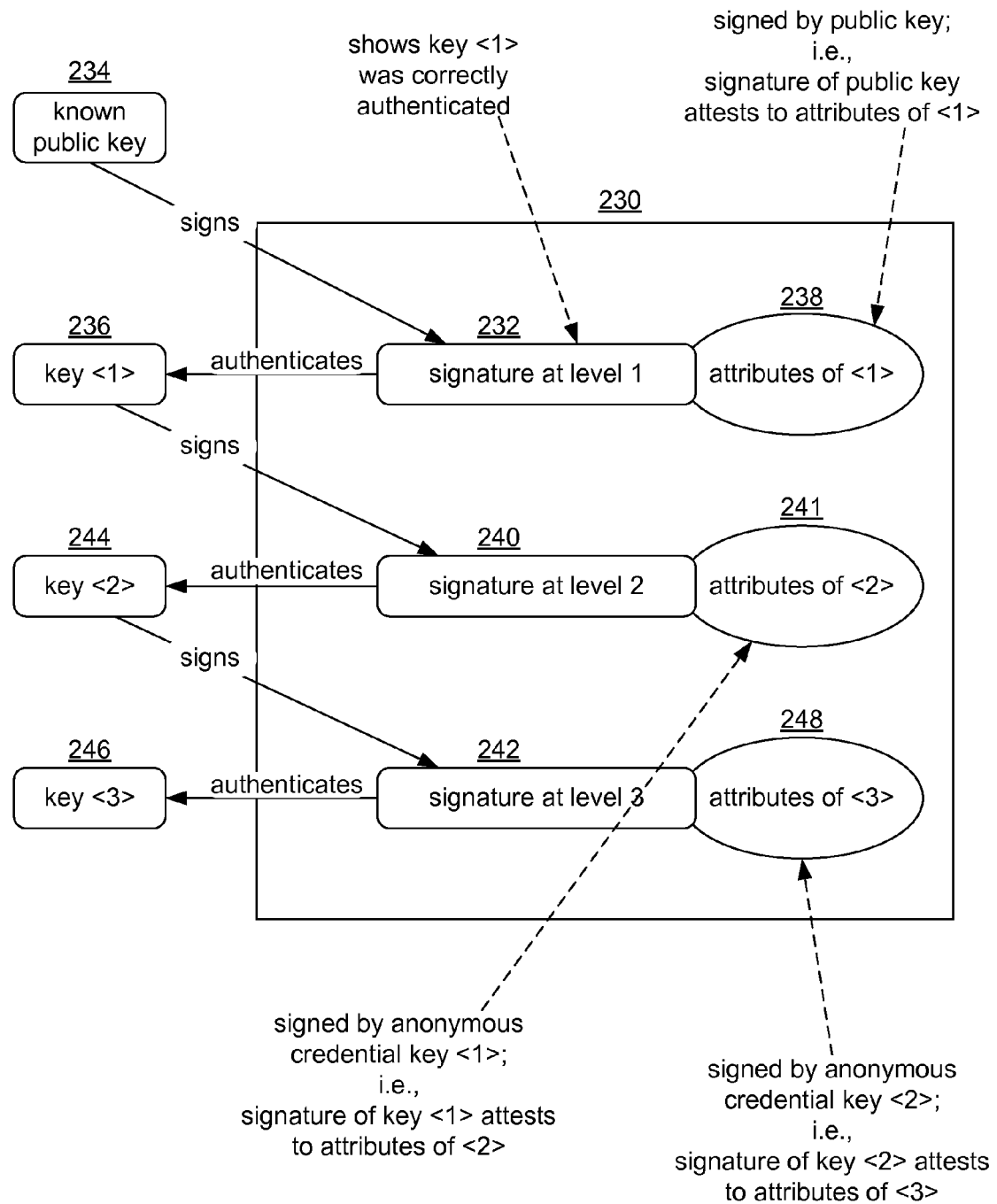
FIG. 5 shows an anonymous credential.

FIG. 5 shows an anonymous credential 230. Anonymous credential 230 is a chain of signatures in which the top signature 232 in the chain is signed by a known key 234. For instance, the top level of the chain can be created by a principal that has published a commitment to their secret key (in effect, publishing their public key). Each level of the chain is a level of delegation that can be shown to have been signed by the key authenticated by the level above. That is, the principals authorized at each level of delegation are anonymous principals; cryptography ensures that only principals with the appropriate keys will be able to use these signed tokens. Other than the top level of known public key 234, this signature scheme does not reveal information about the keys other than the fact that they have been correctly authenticated. At each level of the signature scheme, there is space to attach attributes. Specifically, the signer at each level can assert that the key it authenticates for the next level has certain attributes. The example in FIG. 5 has three levels.

The key authenticated at any level <i> has associated attributes. At level <1>, signature 232 authenticates the fact that key <1> 236 has attributes 238 (e.g., "over age 21"). At level <2>, signature 240 from key <1> 236 authenticates attributes 241 of the level <2> credential. At level <3>, signature 242 from key <2>244 shows that key <3> 246 has attributes 248.

The signature at any level <i> is established by running a protocol between a principal that holds the key authenticated by level <i−1> and the principal that holds the key to be authenticated by level <i>. During the exchange using this protocol, the holder of key <i−1> can attach attributes to the signature. These attributes may be free-form text that can contain any value.

This approach can be used to extend any policy language to allow principals to be authenticated by anonymous credentials. Previously, a non-anonymous principal authenticated by RSA signatures would provide a policy language statement signed by the holder of the RSA key making the statement. For example, if A and B represent RSA public keys, then the statement "B possesses AgeGreaterThan: '21'" would be signed by A. Since a policy language modified for anonymous credentials may allow A and B to be instantiated with principals authenticated by anonymous credentials, A and B can be replaced by placeholder identifiers that represent the level of the corresponding key in a credential. And, instead of providing an RSA signature on a security policy statement, principals can embed security policy statements in the attributes component of an anonymous credential like anonymous credential 230. For example, a simple anonymous credential, issued by the public key of a Department of Licensing (DOL) might say "DOL says <1> possesses AgeGreaterThan: '21'". This statement would be embedded as the attributes of <1> in an anonymous credential with a single level. The public key would be the key for the DOL, and the key of the authenticated user would serve as Key <1>.

The levels of delegation of an anonymous credential are mapped to levels of delegation of principals in the policy language, and this mapping is preserved in the format of the token; each level of the delegation chain is signed with an anonymous signature and signs a statement in the policy language. A statement at level <i> can only refer to principals at level <i> or <i+1>. In effect, an anonymous principal is just a level in the credential. Each anonymous credential is locally scoped; e.g., "<1>" in a policy statement refers to the level <1> credential of the credential requesting access.

When a multi-level anonymous credential is received, for example in XML format, the credential is first deserialized. That is, the XML data is parsed to build constructs of the language. During this deserialization phase each one of the anonymous principals in the credential is scoped to a corresponding placeholder (e.g., "<1>"). Within the scope of a given credential, "<1>", although anonymous, refers to the same principal. If another credential is processed, and it has a "<1>", it is scoped locally only to that credential and refers to a different principal. These anonymous principals such as <1>, <2>, <3>, etc., become anonymous principal type objects in the language, and the root key (e.g., public key 234) attests to the entire credential. The language may be modified to give this key a special principal type, e.g., "anonymous keyholder principal" type.

As mentioned above, delegation may be accomplished by delegating authorization to an ephemeral RSA key that is used for a single access. To delegate in this way, the principal holding key <1> adds a new level to the anonymous credential, as discussed above. The attributes of level <1> in the credential are the statements such as "<1> says EphemeralKey can act as <1>". The principal can then show this credential to a service to gain access to a resource without revealing any information about key <1>.

Notably, the signatures that make up an anonymous credential do not themselves reveal any information about the keys that they authenticate. But, the sequence of bits that makes up a signature is fixed when it is generated by the signature, and this sequence of bits could later be used by the signer to identify the principal holding the signature. To avoid this possibility, anonymous credentials can be re-randomized. As described next, a re-randomized credential attests to the same keys and attributes, but the signer of each signature can no longer link the re-randomized signature with the original.

Variation for Verification of Anonymous Credentials

A technique for implementing anonymous credentials based on the paper "Delegatable Anonymous Credentials", by Belenkiy, Camenish, Chase, Kohlweiss, Lysyanskaya, and Shacham (Crypto 2009), will now be described. In the mentioned paper, an anonymous credential consists of a chain of anonymous signatures. Each signature is signed by a signer and signs a key. The signature is generated as a set of non-interactive zero-knowledge proofs of a set of equations, given commitments to a set of values. In the original scheme, a signature has the following form:

$$\left(g^{\frac{1}{sk+K^*}}, h^{K^*}, (u^*)^{K^*}, \left\{g^{\frac{1}{K^*+K_i}}, h^{K_i}, u_i^{K_i}, g^{\frac{1}{K_i+m_i}}\right\}_{1\leq i\leq 2}\right).$$

Where $g$, $h$, $u_i$, and $u^*$ are generators for the group, sk is the secret key of the signer, $K^*$, $K_i$ are keys freshly generated for this signature, $m_1$ is the key to be signed, and $m_2$ is a public message that contains attributes for this signature. The signer provides commitments to each of the elements of the signature.

To state the verification equations, a signature is written as:

$$(A^*, B^*, C^*, \{A_i, B_i, C_i, D_i\}_{1\leq i\leq 2}).$$

The signature is checked by using Groth-Sahai pairing-product equation non-interactive, witness-indistinguishable proofs to check the following equations, given values $h^{sk}$ and $h^{m_i}$ ($h^{sk}$ is provided by the signer, and $h^{m_i}$ is provided by the verifier):

$$e(A^*, h^{sk}B^*) = e(g, h)$$

$$e(u^*, B^*) = e(C^*, h).$$

And, for i=1 and 2, verify $$e(A_i, B^*B_i) = e(g, h)$$

$$e(u_i, B_i) = e(C_i, h)$$

$$e(D_i, B_i h^{m_i}) = e(g, h).$$

For additional information, see "Efficient Non-interactive Proof Systems for Bilinear Groups", by Jens Groth and Amit Sahai, in Electronic Colloquium on Computational Complexity (ECCC) 14(053):(2007).

Additionally, the signer provides two different commitments to the secret key sk: $u^{sk}$ and $U^{sk'}$, and a non-interactive, witness-indistinguishable proof that sk=sk':

$$e\left(\frac{u^{sk}}{u^{sk'}}, h^\theta\right) = 1$$

$$e(g, h^\theta) = e(g, h).$$

Similarly, the verifier provides two different commitments to the public key $m_1$: $u^{m_1}$ and $u^{m'_1}$ and a non-interactive, witness indistinguishable proof that $m_1 = m'_1$:

$$e\left(\frac{u^{m_1}}{u^{m'_1}}, h^\theta\right) = 1$$

$$e(g, h^\theta) = e(g, h).$$

This requires verifying twelve non-interactive, witness indistinguishable proofs of pairing-product equations, which are the most expensive form of Groth-Sahai proofs. However, this can be improved by using multi-exponentiation equations. A revised form of the signature is as follows:

$$\left(g^{\frac{1}{sk+K^*}}, \left\{g^{\frac{1}{K^*+K_i}}, g^{\frac{1}{K_i+m_i}}\right\}_{1\leq i\leq 2}\right).$$

To refer to elements of the signature, and to maintain the correspondence between this form of the signature and the original, a signature is written as:

$$(A^*, \{A_i, D_i\}_{1\leq i\leq 2})$$

Each of the elements of the signature is committed to, and sk, $K^*$, $K_1$, and $K_2$ are committed to in two ways: one with a commitment using inputs to the right-hand side of the pairing, and one with a commitment using inputs to the left-hand side of the pairing. The committed values are represented as sk, sk', $K^*$, $K^{*'}$, $K_1$, $K'_1$, $K_2$, and $K'_2$. Similarly, the verifier provides commitments to $m_1$ in two ways: the two committed values are represented as $m_1$ and $m'_1$. Then non-interactive, zero-knowledge proofs are provided using the right-hand multi-exponentiation form to prove the following equations for i=1 and 2:

$$A^{*sk+K*} = g$$

$$A_i^{K*+K_i} = g$$

$$D_i^{K_i+m_i} = g.$$

Non-interactive, zero-knowledge, arithmetic-gate equations are generated to prove the following equations:

$$sk = sk',$$

$$m_1 = m'_1$$

$$K^* = K'^*$$

$$K_1 = K'_1$$

$$K_2 = K'_2.$$

This version of the signature scheme preserves the same technical properties as the original (for example, the original scheme committed to elements in two ways to guarantee a property called 'extractability', and the new scheme does the same). But it only requires verification of ten equations rather than twelve, and the types of equations are more efficient to check than the pairing-product equations used in the original version.

Practical Applications

Anonymous credentials used as discussed above have many practical applications. With anonymity, medical records can be submitted to a records database, driver's licenses and age can be verified to access a service, etc. In practice, a person may go to go to some trusted authority (e.g. a doctor's web server), login/authenticate, and request issuance of an anonymous credential (e.g., press a "get credential" button), which is stored on the person's machine. The person then goes to a third party website that receives the credential and verifies a property or attribute of the person. The third party website can be sure that the credential was issued by a trusted authority, that the person is anonymous, and the person has a necessary attribute.

Conclusion

Figure 6:
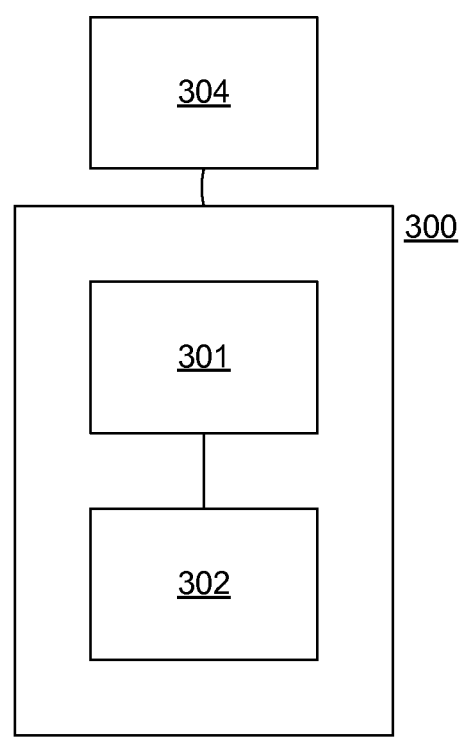
FIG. 6 shows a computer on which one or more embodiments described above may be implemented.

FIG. 6 shows a computer 300 on which one or more embodiments described above may be implemented. A processor 301 is coupled with memory/storage 302 and a display 304. Embodiments and features discussed above can be realized in the form of information stored in volatile or non-volatile computer or device readable storage media. This is deemed to include at least media such as optical storage (e.g., compact-disk read-only memory (CD-ROM)), magnetic media, flash read-only memory (ROM), or any current or future means of storing digital information in a form readily consumable by a computing device. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of evaluating a statement in a security policy language, wherein the security policy language defines elements to represent principals and resources and defines a grammar for statements in the security policy language to specify conditions for principals to be granted rights or privileges with respect to resources, the method performed by one or more computing devices comprising storage and one or more processors, wherein a policy in the security policy language contains the statement and controls access to a resource by credentialed principals, the method comprising:

in response to a request received via a network from a device operated by a principal using an anonymous credential to access the resource, accessing the policy containing the statement and storing the policy in the storage, the statement specifying a credential attribute to be satisfied in order for access to the resource to be granted and the statement comprising a placeholder symbol that represents only arbitrary anonymous credentials, wherein anonymous credentials are types of credentials anonymously associated with respective specific principals such that the anonymous credentials cannot be used to determine identities of the principals; and verifying, by the one or more processors, an attribute of the anonymous credential using a key corresponding to the anonymous credential, and based thereon determining, by the one or more processors, whether to grant the principal access to the resource by determining that the verified attribute of the anonymous credential satisfies the credential attribute specified by the statement.

2. A method according to claim 1, the anonymous credential having been verified with the key by a non-anonymous authority, the key comprising a public key of the non-anonymous authority.

3. A method according to claim 2, the non-anonymous authority having added the attribute to the anonymous credential of the principal.

4. A method according to claim 1, wherein the anonymous credential of the principal is linked to the principal by a random value, the method further comprising re-randomizing the anonymous credential of the principal.

5. A method according to claim 4, wherein a first re-randomization of the anonymous credential of the principal cannot be linked with a second re-randomization of the anonymous credential of the principal.

6. A method according to claim 4, wherein the security policy language comprises a formal computer language and the statement conforms to the grammar and syntax of the formal computer language.

7. A method according to claim 1, wherein the anonymous credential of the principal contains no information by which the principal can be personally identified.

8. One or more computer readable storage media storing information to enable one or more computers to perform a process, wherein the one or more computer readable storage media is not a signal, the process comprising:

receiving a request for access to a service from a user represented by a corresponding anonymous credential, the anonymous credential comprising an attribute and a cryptographic signature of the attribute, computed by a public key of an issuer of the anonymous credential, that verifies the attribute, wherein the signature does not identify the user;

accessing a security policy comprising a statement in a security policy language that comprises a symbol configured to represent any arbitrary anonymous principal that requests access to the resource, the statement associated with the service and controlling access to the service, where the statement also comprises a condition that must be met for access to the resource, the condition comprising a credential attribute, wherein the statement specifies that any arbitrary anonymous credential must satisfy the credential attribute to be granted access to the service; and granting access to the user by determining that the attribute of the anonymous credential satisfies the credential attribute of the condition of the statement by evaluating the statement with the anonymous credential used in place of the symbol.

9. One or more computer readable storage media according to claim 8, wherein the security policy language comprises a computer language, and statements in the security policy language comprise facts, principals, and nestable logical expressions comprised of logical operators and principals or facts as operands.

10. One or more computer readable storage media according to claim 9, wherein the security policy language comprises a principal type that is defined to be anonymous.

11. One or more computer readable storage media according to claim 8, wherein the security policy language defines a type of principal comprising an anonymous principal type.

12. One or more computer readable storage media according to claim 11, wherein the security policy language allows a first instance of an anonymous principal type to delegate right-granting authority to a second instance of an anonymous principal type.

13. One or more compute readable storage media according to claim 8, wherein the anonymous credential comprises a plurality of levels including a top level and a lower level, the top level comprising a signature from a non-anonymous public key and a top level attribute signed by the non-anonymous public key.

14. One or more computer readable storage media according to claim 13, wherein a key at one level of the anonymous credential signs an attribute at a next lower level of the anonymous credential.

15. A method performed by one or more computers to control access to resources provided by a network service, the method comprising:

receiving via a network a request for one of the resources, the request including information identifying the resource and having originated from a computer operated by a user represented by an anonymous credential;

obtaining a security policy corresponding to the resource based on the information identifying the resource, the security policy conforming to a policy language and having a symbol, also conforming to the policy language, that functions as a placeholder for any anonymous credential; and processing the security policy with a module that implements the policy language, the processing comprising using the anonymous credential of the user in place of the symbol.

16. A method according to claim 15, wherein the anonymous credential was generated by a security token service that received a public key from the computer operated by the user and in response generated the anonymous credential by signing an attribute generated by a known authority.

17. A method according to claim 15, wherein the anonymous credential comprises a first signature and a second signature signed by the first signature, and the processing by the module further comprises mapping the first signature and the second signature to a first anonymous credential symbol and a second anonymous credential symbol, respectively, in the security policy.

18. A method according to claim 15, further comprising using an ephemeral security token to bootstrap access to a service providing the resource.

19. A method according to claim 15, wherein the policy language has one or more functions that either operate on or return anonymous credentials.

20. A method according to claim 19, wherein one or more of the functions determine whether or not a principal is an anonymous principal.

* * * * *